July 31, 1962 J. J. KOWALIK ET AL 3,046,721
COTTON HARVESTER WITH AUXILIARY TRASH DISCHARGE MEANS
Filed Oct. 10, 1960 3 Sheets-Sheet 1

INVENTORS.
John J. Kowalik
Delos A. Walker

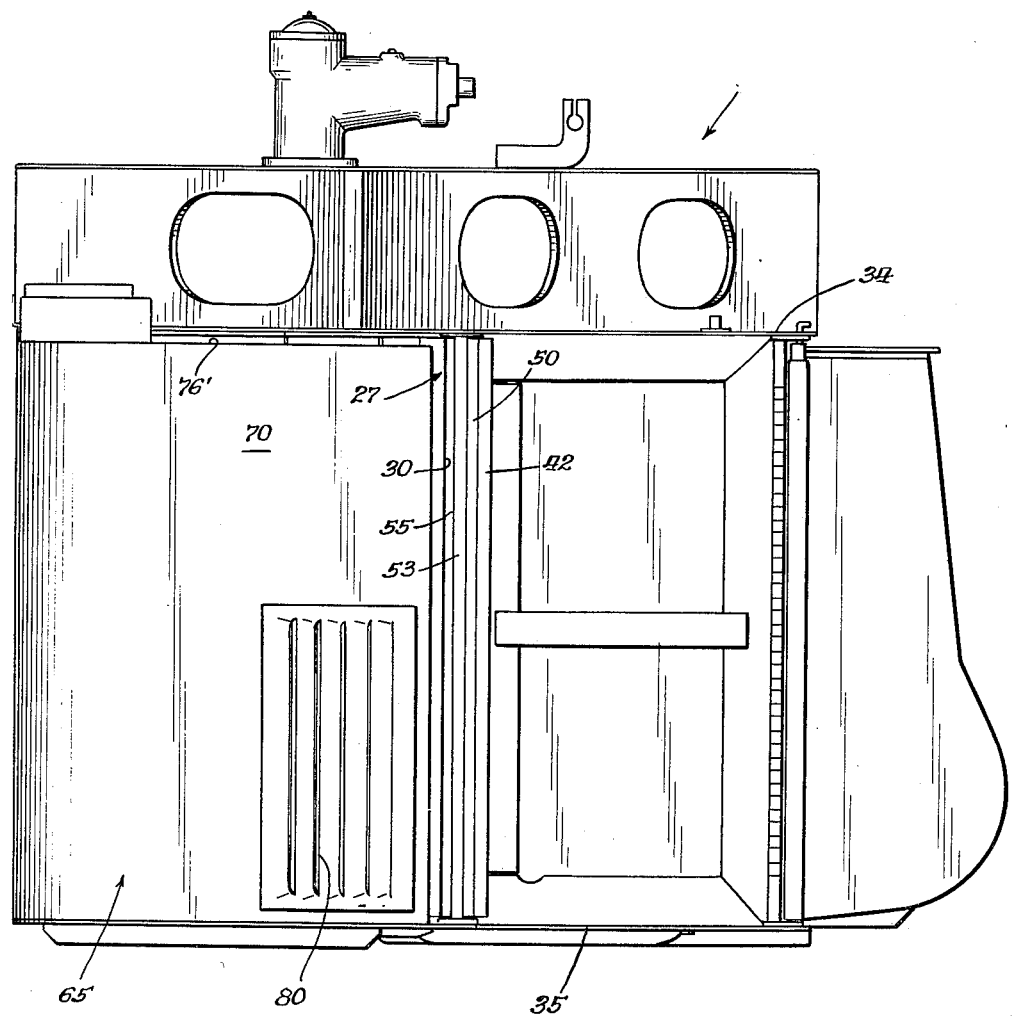

July 31, 1962

J. J. KOWALIK ET AL 3,046,721

COTTON HARVESTER WITH AUXILIARY TRASH DISCHARGE MEANS

Filed Oct. 10, 1960

INVENTORS.
John J. Kowalik
Delos A. Walker
Paul O. Pippel
Atty.

United States Patent Office 3,046,721
Patented July 31, 1962

3,046,721
COTTON HARVESTER WITH AUXILIARY
TRASH DISCHARGE MEANS
John J. Kowalik, Glenview, Ill., and Delos A. Walker, Memphis, Tenn., assignors to International Harvester Company, Chicago, Ill., a corporation of New Jersey
Filed Oct. 10, 1960, Ser. No. 61,642
10 Claims. (Cl. 56—41)

This invention relates to cotton harvesters, and more specifically to a harvester of the type commonly known as a cotton picker which comprises spindles which are so arranged as to enter a plant and entwine cotton thereon and withdraw the cotton from the plant and deliver the same to an associated conveying structure.

The apparatus to which the present invention appertains is generally shown in U.S. Patent 2,140,631 and is of a type which comprises an upright picker housing which presents a picking throat through which the standing cotton plants pass attendant to the apparatus being advanced along a row of such plants in the field, the housing enclosing a drum which includes a series of spindles moved about a vertical axis into and out of the plants and the spindles being swept by doffing means which discharges the material to a conveying system which is of a suction or pneumatic type for delivery to a receptacle carried by the machine.

In cotton which is presently being harvested it is desirable under certain conditions to provide the instant invention inasmuch as there is an inordinate amount of trash commingled with the cotton. Therefore it is an object of this invention to provide a novel trash removing or discharging apparatus for removing the trash from the cotton as each group of spindles emerges from the plant row and swings into doffing position centrifugally casting off the accumulated trash and the like.

A more specific object of the inventtion is to provide in the rear wall of the cotton picker housing an arrangement of trash discharge openings such that they are located in the trajectory of the trash as cast off by the picker spindles.

A still further object of the invention is to provide a novel rear wall structure for a cotton picker of the type described wherein the rear wall structure provides a trash discharge opening which opens laterally of the housing and wherein a portion of the rear wall structure forms a novel cutoff edge for cleaving trash off the spindles which may hang onto the cotton as the spindles sweep past the edge.

In cotton harvesters of the type under discussion recent attempts have been made to provide trash discharge openings. These openings opened rearwardly and therefore required that the trash be redirected by means of baffles and the like. The rearward opening of the trash discharge exits faces the tire treads of the ambulatory support carrying the harvester. Numerous complaints have been received that when the soil is slightly damp it is being carried by the tread of the tire as the picker is being operated in the field, and is thrown through the trash discharge openings into the drum. This condition at times can be so prevalent that it actually prevents the trash from discharging and further aggravates the cleaning in that the dirt is being thrown into the picking drum.

An important object of the present invention is to so arrange the direction of the discharge opening so that it is shielded by the rear wall structure and at the same time does not obstruct the free flow of the trash material out of the picker drum.

A further object of the invention is to provide a novel means for adjusting the trash discharge opening, the means being in the form of a plate which is mounted on the rear wall structure of the cotton picker housing and extends transversely of the direction of operation of the picker and wherein the plate is adjustable transversely of the picker and which extends alongside the trash discharge opening in uncovering and covering relation thereto with respect to the tread of the wheel which is disposed directly therebehind, the plate further serving to prevent recirculation of trash which may be discharged from another trash opening disposed immediately adjacent to the row of cotton plants through the first-mentioned discharge opening which is spaced laterally outwardly from the other opening, and the plate further serving as a closure for the other opening under appropriate conditions.

A still further object of the invention is to provide a novel rear wall structure wherein a plurality of discharge openings are provided in the rear wall structure spaced transversely of the cotton picker drum and wherein a portion of the rear wall structure is disposed substantially tangential to the peripheral path of the tips of the cotton picker spindles and serving to separate the trash from the cotton which is entwined on the spindle.

These and other objects and advantages inherent in and encompassed by the invention will become more readily apparent from the specification and the drawings wherein:

FIG. 2 is an enlarged side elevational view of the cotton harvester;

Figure 1:
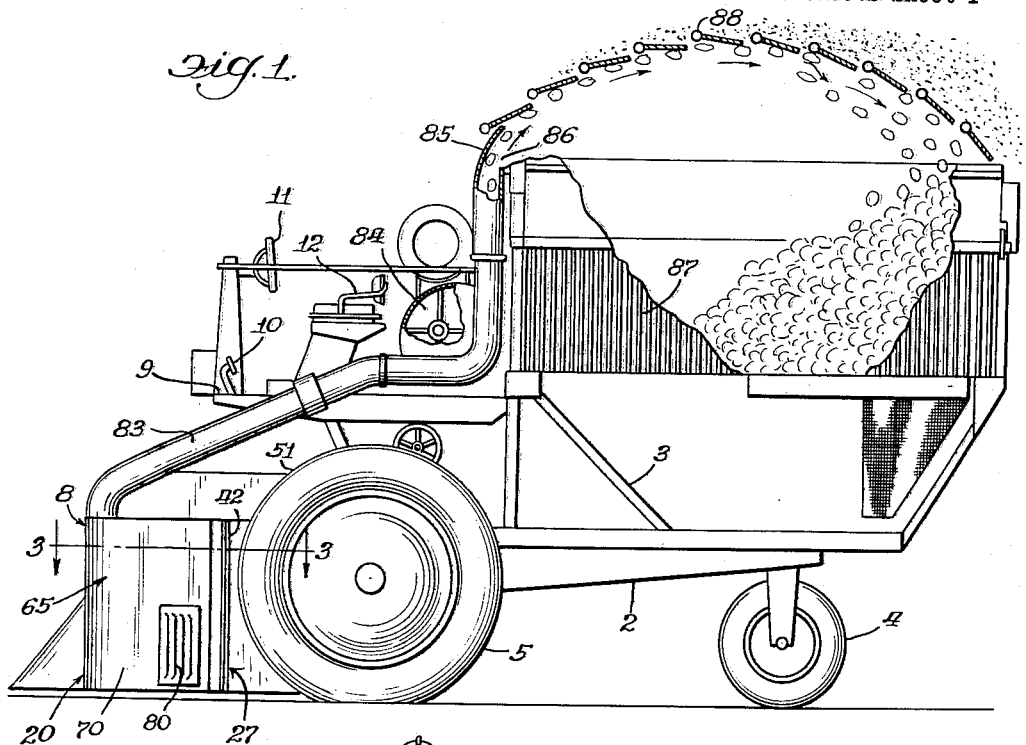
FIG. 1 is a side elevational view partially in vertical section and with parts broken away showing the novel structure in association with the rest of the mechanism.
Figure 4:
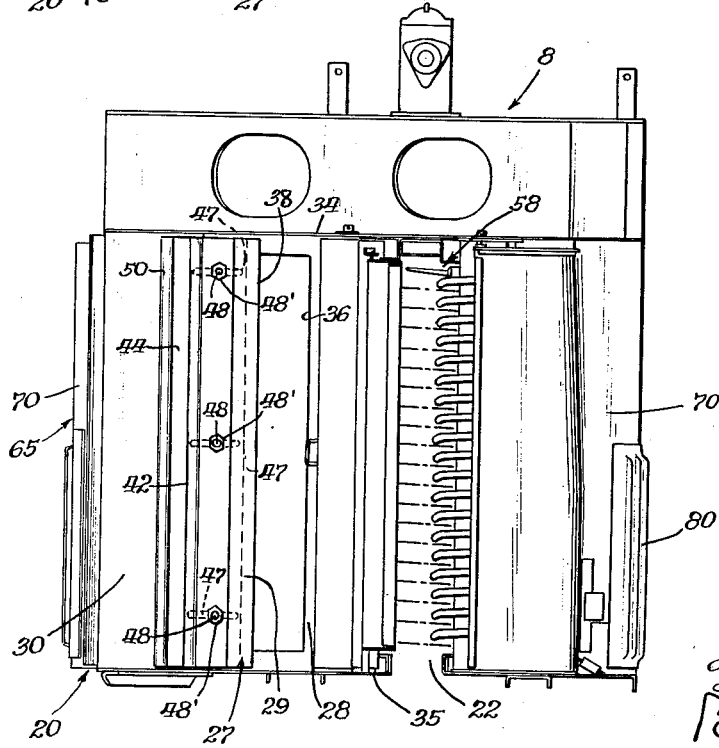
FIG. 4 is a rear elevational view of the structure shown in FIG. 2.

The harvesting or picking machine chosen for purposes of illustrating comprises a supporting frame or body 2 which is a conventional ambulatory motorized unit to advance the cotton harvester over the field. The harvester comprises a framework 3 which is supported on the rear steering or caster wheel 4 and forward large traction wheels 5 which are disposed at each side of the machine, as is well known to those skilled in the art. The harvesting unit carries forwardly thereof a picking mechanism housing structure indicated in its entirely by the reference numeral 8. The supporting structure between the carrier unit 2 and the housing 8 is of conventional design and has no particular importance to the present invention. One such arrangement for mounting the harvester to the carrier is shown and described in detail in U.S. Patent 2,688,223.

The framework 3 carries the operator's platform 9 which mounts the controls 10 and the steering unit 11 which is suitably connected to the wheel 4 for steering the carrier and thus the harvester. The platform supports a seat 12 for the operator as is conventional practice.

The harvesting unit 8 comprises front and rear sections 20 and 21, the rear section being substantially of conventional structure as will be readily understood by those skilled in the art. The front and rear or left and right picking units are respectively disposed at opposite sides of the throat or plant passage 22.

The left picking unit 20 is composed of a picker housing formed by a front or forward upright wall structure 23 which is generally imperforate and extending around the front portion of the unit 20. The particular configuration of the front housing structure 23 is relatively unimportant other than that it does enclose completely the forward side of the picking mechanism. A side wall structure 24 extends adjacent the passage 22 from the inner end or edge of the forward housing structure 23 rearwardly. As is conventional, the housing structure 24 adjacent to the passage 22 is composed of a plurality of vertically spaced horizontal grid bars 25 which form therebetween fore and aft extending passages through which the spindles on the picking drum (later to be described) may pass into the passage 22. At the rear of the unit 20 there is provided upright rear wall structure 27 which is generally disposed transversely to the direction of travel of the harvesting unit. The rear housing structure is formed by a plurality of laterally spaced inner, intermediate and outer vertical stepped panel sections 28, 29 and 30, the inner panel section 28 extending from the rear ends 32 (FIG. 3) of the slats or bars 25 and angled rearwardly therefrom toward the outboard side of the picker housing and at its upper and lower ends respectively connected to the top and bottom walls 34 and 35 of the picker housing 20, the panel section 28 terminating in an outboard edge 36 defining the inboard margin of a vertically disposed rearwardly open trash discharge opening 37, the opening 37 extending substantially the full height of the picking drum. The outboard margin of the first trash opening 37 is defined by the inner edge 38 of the vertical intermediate panel 29 which is in substantial alignment with the outboard portion 40 (FIG. 3) of the inboard panel 28. The panel 29 connects at its upper and lower ends with the upper and lower walls 34 and 35 of the picker housing 20 and at its outboard edge is formed with a stiffening bead 42 by being bent back upon itself. The panel 29 supports a substantially flat plate 44 (FIG. 3) which seats against the forward or inner side 45 of the panel 29 and extends laterally outboardly with respect to the panel 29, the plate 44 having substantially the same vertical extent or length as the panel 29 and being provided with a plurality of laterally elongated generally horizontal slots 47 through which are admitted bolts 48 which extend through openings 49 in panel 29 and held by nuts 48' by which the extension panel 44 is secured to the intermediate panel 29. It will be realized that by virtue of the laterally elongated slots 47, the extent of the intermediate wall structure 29 transversely of the picker unit is adapted to be varied by placement of the panel 44 in various positions inboardly and outboardly with respect to the panel 29. The outboard edge of the panel 44 is turned to provide a vertical bead 50 to strengthen the panel and to provide a hand hold as well as an obstruction against dirt which may be thrown forwardly from the periphery of the tire 51 of the wheel 5 as the unit is operating in the field harvesting cotton. The same function is attributed to the bead 42.

It will be understood that the use of the extension panel 29 is selective or optional depending upon various crop conditions, also to prevent possible recirculation of trash which may exit from the opening 37 so that it is prevented from entering the opening 53 in the rear wall structure, said opening 53 being disposed widthwise fore and aft of the unit whereas the opening 37 is disposed transversely of the unit. The opening 53 is developed between the outboard edge 42 of the intermediate panel and the inboard edge 54 of the outboard panel 30, which in the present construction is angled slightly rearwardly inboardly of the unit 23, the inner edge portion 54 being rounded by bending this edge of the panel upon its backside to provide a bead structure 55 to prevent any trash or the like from hanging onto the edge 54 which is located in a plane substantially tangential to the peripheral path of the outer tips 56 of the cotton picker spindles 57 of the picker drum generally designated 58. It will be observed that the opening 53 is aligned with the trajectory, designated by the arrow 59, of trash material which is being discharged from the picker unit 58 pursuant to its rotation as indicated by the arrow 60 in FIG. 3. It will be understood that panel 30 extends between the upper and lower walls 34 and 35 of the housing 23 and is connected thereto.

It will be understood that the unit 23 is therefore enclosed generally at the front, inner side, and rear by the upright housing structures 23, 24 and 27 thereby leaving an open outer side. However, the terms "inner," "outer," "outboardly," "inwardly," "inboard" and "outboard" refer generally to the location of the particular part or section relative to the throat or passage 22, the structure adjacent the throat being considered the innermost part of the harvester.

The outer side of the housing compartment is closed by a door structure generally indicated 65. The door 65 is hingedly mounted for horizontal movement on a forward bracket 66 which extends outwardly from the bottom plate 35 of the harvester, the door being pivoted on a vertical shaft 67. The door structure 65 is conventional in that it comprises inner and outer panel means 69 and 70 joined together by curved front wall structure 71 and intermediate their ends by a vertical baffle panel 72 which divides the door into front and rear compartments 73 and 74, the compartments being joined by passage 75 which is disposed between the lower edge of the panel 72 and the bottom panel 76 of the door structure, the bottom panel 76 interconnecting the lateral inner and outer panels 69 and 70 and the front panel 71 and tapering rearwardly whereat the rear portion of the outboard panel 70 is angled inboardly from the rear side of the door. A top panel 76' joins the panels 69, 70, 71 and 72.

The rear compartment communicates through an inlet opening 77 on the inner side of the door structure with the interior of the housing structure 23 for the passage of cotton which is being discharged from the spindles 57 by the doffer 79 which sweeps over the spindles as the spindles are orbited about the axis of the drum 60 as is well known to those skilled in the art, the cotton entering the rear chamber 74 wherein it is entrained in air which is being drawn through the louvered or perforated grille structure 80 which is formed as part of the outer panel 70 opposite the opening 77 whereby the cotton and the air are passed under the panel 72 through the passage 75 and is drawn through the piping or duct work 82 (FIG. 3) which is formed integral with the proportion of the front and lateral panels of the door structure adjacent to the forward end of the door, the duct structure 82 communicating with piping 83 which communicates with a suction fan 84, the discharge or pressure side of the fan leading into the piping 85 which has a discharge outlet 86, said outlet 86 being directed into a basket or container 87 under a grating 88 which allows the trash to be blown out pursuant to the discharge of the cotton from the outlet 86, the basket 87 being carried in usual manner upon the framework 3.

It will be understood that the picking unit 21 at the opposite side of the passage 22 to unit 23 is generally similar thereto and has a drum indicated 90 within the housing structure 21. The unit 90 comprises a rotor which includes a plurality of vertically arranged picker bars with a series of spindles 91 which rotate on their individual axes similar to spindles 57 and are bodily moved in generally horizontal planes about the axis of the rotor 90 in the direction as shown by the arrow 92 whereby the spindles 91 are caused to exit from the housing 21 into the passage 22 and ladened with cotton move under the doffing mechanism 93 which strips the cotton from the spindles and discharges it into the chamber 94 whereat it is in position to be sucked by the suction of an associated fan (not shown) through the duct work 95 as is well known to those skilled in the art.

It will be noted that the rear wall structure of the rear drum is different from that of the front drum inasmuch as the front drum not only picks the greater percentage of the cotton but also the incidence of trash is much greater in the front drum than in the rear.

It will be readily appreciated that a novel mechanism has been provided for adequately separating the trash from the cotton wherein the parts are so arranged where the flow of the trash and the movement of the cotton is unimpeded and at the same time the arrangement is such as will prevent the entry of clods of dirt which in constructions heretofore in use tended to enter into the housing structure. Furthermore, the construction of the rear wall structure is considerably improved, strengthening the housing.

Figure 3:
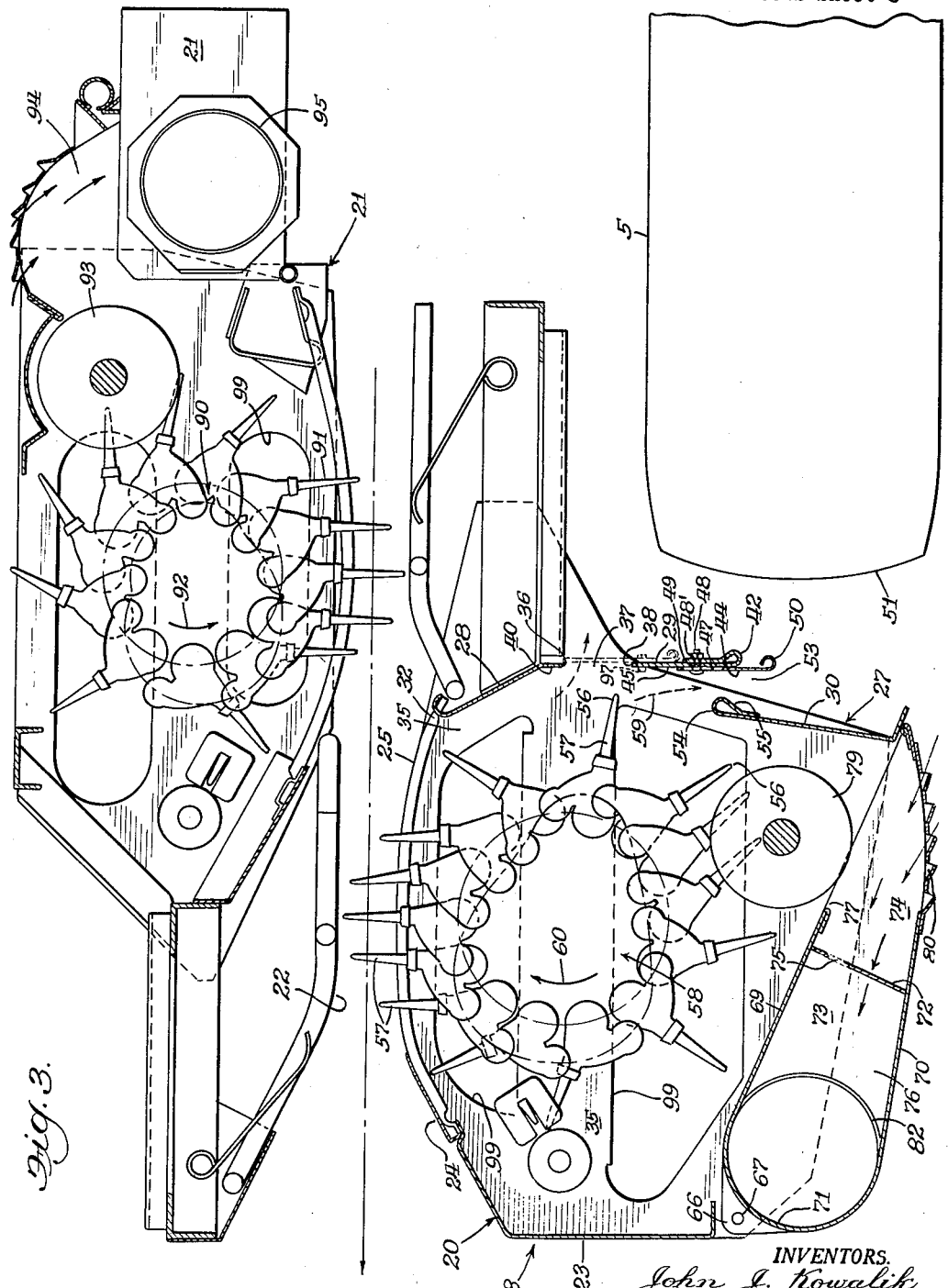
FIG. 3 is a substantially horizontal sectional view taken substantially on the line 3—3 of FIG. 1.

It will be understood that the plate 44 which is shown in extension position to the wall 29 may be secured to the rear side of the wall structure 29 and bolted thereto as by bolts 97 in closing position to the trash discharge opening 37 as shown in phantom lines in FIG. 3. Under certain conditions this may be desirable. It will also be understood that the bottom walls 35 of the housings are provided with trash discharge openings 99 as is conventional practice.

In action, the small radius of the cam track opposite the rear wall, as best seen in the drawings, causes the spindles to whip in this region centrifugally casting trash through the discharge openings which are aligned with the trajectory of the trash.

What is claimed is:

1. A picking unit for a cotton harvester comprising a vertically elongated housing having a side, a picking drum mounted in said housing, said drum having picking spindles extending laterally therefrom, said housing having a vertical opening through which said spindles extend, said portion having a pair of stepped portions spaced fore and aft of the housing and defining a laterally directed discharge opening.

2. In a cotton harvester having an ambulatory structure including wheel means, a picking unit mounted upon the structure ahead of the wheel means and having a vertically elongated housing with a side portion opposing the wheel means, said housing portion having fore and aft offset segments defining a trash discharge opening directed transversely of the harvester, said aft segment shielding said opening from said wheel means.

3. The invention according to claim 2 and a picking drum mounted in said housing, said drum having spindles extending laterally therefrom, said spindles having a peripheral path sweeping substantially tangentially with respect to said fore section.

4. The invention according to claim 2 and a picking drum mounted in said housing, said drum having spindles extending laterally therefrom, said spindles having a peripheral path sweeping substantially tangentially with respect to said fore section, and said portion having a rearwardly directed opening disposed inboardly of the first-mentioned opening and said spindles having a path portion directed toward said rearwardly directed opening.

5. The invention according to claim 2 and a picking drum mounted in said housing, said drum having spindles extending laterally therefrom, said spindles having a peripheral path sweeping substantially tangentially with respect to said fore section, and means comprising a plate adjustably mounted on said aft section in lateral extension thereof and positionable laterally of the housing in fore and aft rearwardly spaced overlapping relation to the fore section.

6. The invention according to claim 2 and a picking drum mounted in said housing, said drum having spindles extending laterally therefrom, said spindles having a peripheral path sweeping substantially tangentially with respect to said fore section, and means comprising a plate adjustably mounted on said aft section in lateral extension thereof and positionable laterally of the housing in fore and aft rearwardly spaced overlapping relation to the fore section, said side having another trash discharge opening ahead of said first-mentioned opening and said plate positionable in closing relation to said other opening.

7. A picking unit for a cotton harvester comprising a housing with an upright transverse rear wall structure, a picking drum mounted in the housing, said drum having spindles extending laterally therefrom, said housing having an inboard side with an opening through which the spindles extend to pick cotton from a row of plants along which the unit is being operated, said rear wall structure having an opening extending widthwise transversely of the rear wall structure, said rear wall structure having a wall portion defining a front edge of said opening extending substantially coincidental to the peripheral path of the said spindles.

8. A picking unit for a cotton harvester comprising a housing having an upright rear wall structure including a pair of wall sections extending transversely of the unit and spaced from each other fore and aft of the unit and providing a trash discharge opening directed outboardly of the unit.

9. In a cotton harvester having an ambulant structure with wheel means, a picking unit supported before said wheel means and having a housing including an upright peripheral wall disposed in fore and aft alignment with the wheel means, said wall having a trash discharge opening and having wall portions defining the opening and disposed in shielding relation to the opening as respects to said wheel means to prevent the latter from throwing dirt into the housing through the opening.

10. A cotton picking unit having an upright housing having a peripheral substantially vertical wall, a picking drum rotatably mounted in the housing and having peripheral picking means orbiting in a path sweeping along the wall, said wall having a portion disposed in a plane substantially tangential to said path of said picking means for cleaving trash off cotton carried by said picking means.

References Cited in the file of this patent
UNITED STATES PATENTS 2,904,948    Hubbard _____ Sept. 22, 1959
2,986,861    Hubbard _____ June 6, 1961